INVENTORS.
GÉRARD MELCHIOR
JEAN-PIERRE DOURY
BY Kurt Kelman
Agent

INVENTORS.
GÉRARD MELCHIOR
JEA-PIERRE DOURY
BY Kurt Kelman
Agent 3,333,054

RECEIVING ARRANGEMENTS FOR THE RECEPTION OF COLOUR TELEVISION SIGNALS

Gérard Melchior and Jean-Pierre Doury, Levallois, France, assignors to Compagnie Francaise de Television, a corporation of France Filed Nov. 30, 1964, Ser. No. 439,493
Claims priority, application France, Dec. 3, 1963, 955,789
5 Claims. (Cl. 178—5.4)

ABSTRACT OF THE DISCLOSURE

The invention relates to a means for improving the definition of a low definition luminance signal resulting from the suppression of its frequency band in the color subcarrier range. An approximate correcting signal is added to the low definition luminance signal. The approximate correction signal is proportional to the difference between the signal components lying in the color subcarrier range and an amplitude limited signal derived from the last-mentioned signal.

The present invention relates to arrangements for the reception of complex video signals in compatible colour television, these signals comprising a wide-band luminance signal and a sub-carrier modulated in frequency (or phase) by an auxiliary colour information, the frequency band of the colour channel occupied by the modulated sub-carrier, being included in the transmission band of the luminance signal.

The complex video signal of the SECAM system with frequency modulation of the colour sub-carrier is one example of signals to which the invention may be applied. In this case the colour information consists of two different colour signals alternating at line frequency, and the colour channel is situated in the upper region of the spectrum of the luminance signal.

With a view to setting forth the invention more clearly, the latter will be described as applied to this particular case, which is given by way of a non-limitative example.

On reception of such signals, the problem often arises of separating the luminance and colour signals, and in particular of suppressing the modulated sub-carrier from the complex video signal so as to retain only the luminance signal.

If, for example, it is desired to apply the luminance signal to one electrode of a picture reproducing tube in order to control spot brightness, it is preferable first to suppress the sub-carrier for it is a harmful spurious signal from the point of view of luminance. In other cases, it may be desired to suppress the colour signals with a view to substituting other colour signals of different standards, such as for effecting a conversion of standard.

A known solution of this problem consists in eliminating from the complex video signal those components which lie in a frequency band-width coinciding at least approximately with the colour channel, which is occupied by the modulated subcarrier.

The mutilated signal thus obtained, and which will be designated "base signal" is then a substantially pure luminance signal. The drawback is a loss of picture definition, which is far from being negligible, as the suppressed frequency band must be comparatively wide in the case of a frequency modulated subcarrier.

An object of the present invention is to remedy this drawback through the adjunction to the base signal of an auxiliary signal derived from that portion of the complex video signal lying in the colour channel.

In the present application, the term angular modulation or angle modulation will be used to designate any modulation which affects the instantaneous phase of an oscillation; phase modulation and frequency modulation being particular forms of angular modulation.

According to the invention, a subcarrier suppressing arrangement for a complex video-signal including a wide band luminance signal and a sub-carrier which is angularly modulated by a colour information, said modulated subcarrier occupying a colour channel lying within the frequency band of the luminance signal comprises a filtering arrangement for deriving from said video-complex signal and delivering respectively at a first and a second output, a first signal, to be designated "base signal" possessing practically only components of the luminance signal, and a second signal to be designated "compound signal" whose frequency bandwidth coincides approximately with the colour channel; amplitude limiting means having an input coupled to said second output for delivering an "amplitude limited compound signal"; means for delivering an approximate partial luminance signal, which is proportional to a "difference signal" equal to the difference between the compound signal and the amplitude limited compound signal multiplied by $A_0/B$ where B is the limitation threshold of the amplitude limiting means and $A_0$ the amplitude of the subcarrier, the approximate partial luminance signal being preferably limited to the frequency bandwidth of the compound signal; and means for adding the partial luminance signal to the base signal.

The invention will be better understood and other characteristics thereof will become apparent from the following description and the accompanying drawings in which.

The same elements are designated by the same reference numbers throughout all the figures.

Figure 1:
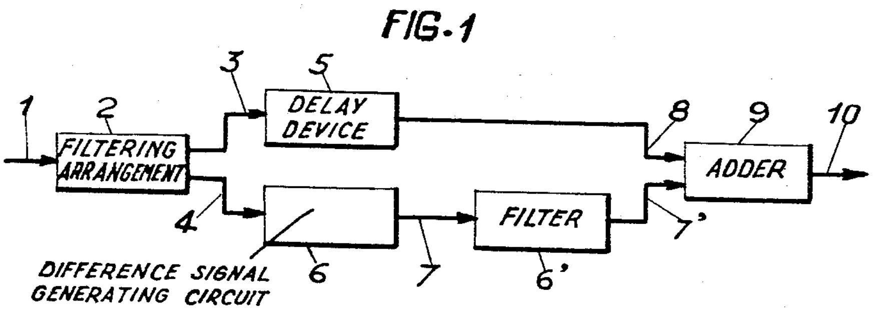
FIG. 1 shows one embodiment of an arrangement according to the invention.

The circuit of FIG. 1 comprises a filtering arrangment which receives at its input 1 the complex video signal and decomposes it by filtering into a first signal (base signal) delivered at output 3, containing practically only luminance components, and a second "compound" signal delivered at output 4, and including, among others, the sub-carrier angularly modulated by the colour information. It will first be assumed that these two signals are complementary, i.e. that their summation would reproduce the original complex video signal.

The first signal ("base signal") is delayed in a delay equalization device 5 and is applied to the input 8 of an adder 9.

The compound signal is applied to device 6, having an output 7, delivering said "difference signal" with a factor 2. The bandwidth of this latter signal is limited to that of the compound signal in filter 6'. The output signal from filter 6' is applied to the second input 7' of adder 9, which thus delivers at its output 10 the sum of the base signal and of twice said difference signal with a limited bandwidth.

The filtering arrangement 2 may consist of two filters fed in parallel, one transmitting the frequencies of the colour channel band to output 4, and the other filter having a complementary characteristic.

Delay device 5 is of conventional form and is adjusted to delay the first signal by a time equal to the delay suffered by the transmitted components of the compound signal.

Figure 2:
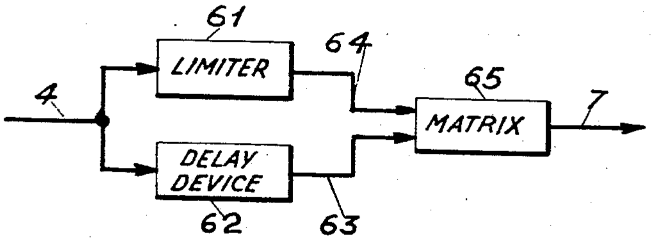
FIG. 2 shows one embodiment of a circuit used in the arrangement of FIG. 1.

FIG. 2 shows one embodiment of the arrangement 6 of FIG. 1.

The compound signal supplied by output 4 of the filtering arrangement 2 feeds on the one hand a "linear channel," and on the other a "non-linear channel" consisting of an element 61, which may be a limiter or any other known device which, when fed with an oscillation modulated both in amplitude and angularly, delivers an oscillation of constant amplitude and of the same instantaneous phase as the applied oscillation.

The linear channel may include a delay device 62 which introduces a delay equal to that suffered by the signals transmitted by the non-linear channel when this delay cannot be disregarded.

The output of the linear channel is connected to input 63 and the output of the non-linear channel to the other input 64 of a matrix 65 which delivers at its output 7 a signal whose instantaneous value is a predetermined linear combination of the instantaneous values of the signals applied to that input.

To simplify notations, in the following explanation relative to the action of device 6 the delay $T_0$ suffered by the input signal in both channels 61 and 62 will be disregarded. In other words $T_0$ will be made zero, this having no bearing on the general nature of the description.

The compound signal $E_M(t)$ applied at input 63 of matrix 65 can be written:

$$E_M(t)=A_0[\sin w_0t+P(t)]+L(t) \qquad (1)$$

where the first term of the second member represents the "colour sub-carrier," i.e. the sub-carrier modulated by the colour information, $A_0$ being its constant amplitude, $w_0$ its resting frequency and $P(t)$ the variable phase shift resulting from the modulation of the frequency as from a time of origin, and expressed by an integral as a function of time. This particular way of expressing a frequency-modulated oscillation is well known.

$L(t)$ represents the luminance components included in the compound signal.

It is also known that under certain conditions, which will be taken as generally fulfilled in the compound signal, the second member of Relation 1 can also be expressed by:

$$[A_0+A(t)] \sin [w_0t+P(t)+Q(t)]$$

this expression representing the sub-carrier oscillation modulated in frequency by the information, and further affected by a spurious amplitude modulation $A(t)$ and a spurious angular modulation expressed by the angle $Q(t)$, these two spurious modulations being due to the presence of the luminance components $L(t)$ in the spectrum of the compound signal.

To simplify notations let it be set:

$$Z(t)=w_0t+P(t)+Q(t)$$

Under these conditions the compound signal is expressed by:

$$E_M(t)=[A_0+A(t)] \sin Z(t) \qquad (2)$$

The signal $E_N(t)$ supplied by limiter 61, adjusted to threshold B, is:

$$E_N(t)=B \sin Z(t) \qquad (3)$$

Experience shows, and theoretical and practical considerations confirm, that an approximation of the signal $L(t)$ giving satisfactory results in practice is, in the particular example $L'_a(t)=2A(t) \sin Z(t)$, limited to the bandwidth of the compound signal. The corresponding signal with a wider band $L_a(t)$ can be obtained by the operation: $2[E_M(t)-(A_0/B)E_N(t)]$, as can be verified by replacing $E_M(t)$ and $E_N(t)$ by their expressions given in Relations 2 and 3.

This operation is carried out by matrix 65 which receives on its two inputs the signals $E_M(t)$ and $E_N(t)$.

The signal leaving matrix 65 collected at output 7 is applied to filter 6' of FIG. 1.

As a necessary condition for correct operation of the arrangement described it has been assumed that the colour sub-carrier has a constant amplitude $A_0$.

As just described, the arrangement is therefore not applicable to the complex video signals of the "SECAM" system, when the sub-carrier modulated in frequency by the colour information has suffered at the transmitter, prior to adding it to the luminance signal, selective attenuation by means of a filter whose relative gain as a function of the frequency increases on both sides of the resting frequency of the sub-carrier, this filter, for short, being designated as a coding filter.

When this improvement is utilised, the corresponding colour sub-carrier, which will be referred to as the "coded colour sub-carrier" is no longer of constant amplitude since the selective characteristic of the coding filter impresses upon it a phase modulation and an amplitude modulation, which will be referred to as "coding" modulations, depending on the frequency modulation. But in this case the coding amplitude modulation is readily suppressed, and also the coding phase modulation, by means of a decoding filter whose characteristic is the inverse of that of the coding filter, and identical to that normally used in colour receivers before the sub-carrier is demodulated. This decoding filter is best inserted at the input of device 6 of FIG. 1. Since it also acts on the components $L(t)$, a coding filter identical to the transmitter filter is then inserted at the output of device 6 so as to correct the approximate partial luminance signal.

One could also insert the two filters of inverse characteristics respectively at the input and output of the arrangement of FIG. 1, or on either side of limiter 61 of FIG. 2, as it will be readily seen that this is equivalent to inserting them at the input and output of device 6 of FIG. 1.

It has been indicated that, to secure a correct operation of the arrangement of FIG. 2, a fixed relation had to exist between the amplitude $A_0$ of the colour sub-carrier (if need be "decoded") and the amplitude B at the output of limiter 61. So this arrangement would cease to act correctly if for any reason, e.g. instability of the transmission equivalent, the amplitude of the colour sub-carrier happened to vary.

In this case, in order to re-establish a correct operation, it would be necessary to alter the adjustments of device 6 by varying either the elements which determine the matrix characteristics, or, which is generally easier, those which determine the amplitude B at the output of limiter 61.

Figure 3:
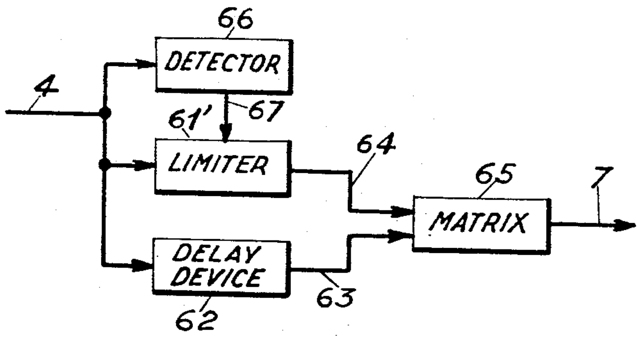
FIG. 3 shows an improvement to the circuit of FIG. 2.

An improvement to the arrangement of FIG. 2 consists in adding some elements so that this alteration to the adjustments shall take place automatically instead of necessitating action by an operator. FIG. 3 shows one mode of realization of such an improvement in which the limiter output level B is controlled electrically as a function of the mean amplitude over an appropriate time interval, of the sub-carrier containing spurious amplitude and angular modulations forming the compound signal, this being the only sub-carrier practically accessible. It contains the same elements as in FIG. 2 but limiter 61 is replaced by a "modulator-limiter" 61', i.e. by a limiter whose threshold can be varied by means of a DC voltage and whose output level varies—at least approximately—linearly with this voltage.

The threshold control DC voltage is applied at an additional input 67 of limiter 61'. It is supplied by an amplitude detector 66 fed by input 4.

It is of course essential that amplitude detector 66 shall respond only to slow variations of the compound signal amplitude, i.e. to variations of the nominally fixed amplitude $A_0$ and not to amplitude variations of the compound signal due to the luminance components L($t$), otherwise zero signal would appear at output 7.

Figure 4:
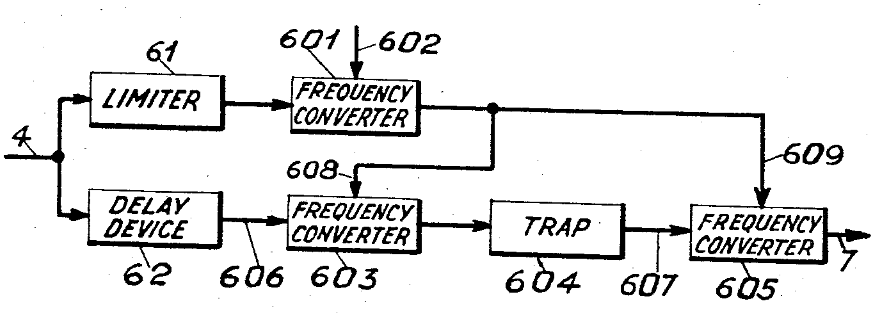
FIGS. 4 and 5 show further embodiments of the circuit of FIG. 2.

An improved embodiment of arrangement 6 of FIG. 1 is shown in FIG. 4.

The compound signal feeds the two channels simultaneously.

The first channel includes a limiter 61, whose output is connected to the first input of a frequency converter 601 whose second input 602 receives a locally generated oscillation of frequency $F_1$ and of angular frequency $w_1$ which is outside the range of instantaneous frequencies which the compound signal may have in practice.

It will be assumed, for instance, that $w_1$ is higher than the upper limit of this interval, and, to simplify notations, it will be assumed in addition that the phase of the corresponding oscillation is zero at time $t=0$. Further, the constant coefficients depending on the frequency converter characteristics and on the amplitude of the angular frequency oscillation $w_1$, will be left out of consideration.

In this example, frequency converter 601 is an adding converter supplying the signal $B \sin [w_1t+Z(t)]$ whose instantaneous frequency is $$w_1+\frac{dZ(t)}{dt}$$

The second channel includes a delay equalizer 62, whose output is connected to the first input 606 of a frequency converter 603.

The output from the latter is connected to the first input 607 of a frequency converter 605 through a device 604 which will be described further on.

The second inputs 608 and 609 of frequency converters 603 and 605 are connected to the output of frequency converter 601.

The output of frequency converter 605 corresponds to the output 7 of the arrangement.

Frequency converter 603 is a substractive converter supplying the signal which, in view of the expression for its input signals, will be designated "self-transposed" signal, and is of the form:

$$[A_0+A(t)]\ B \sin w_1t$$

The effect of device 604 is to suppress frequency $F_1$ from among the spectrum components of this signal. As the signal applied to this device takes the form of a carrier oscillation of Frequency $F_1$ modulated in amplitude, the output signal thus becomes a suppressed carrier amplitude modulation, i.e. only the modulation products are transmitted.

Arrangement 604 could take a form similar to that of arrangement 65 of FIG. 2, i.e. the form of a matrix in which a signal of frequency $F_1$ and of constant amplitude would cancel the component of frequency $F_1$, i.e. the carrier $A_0 \sin w_1t$ of the amplitude-modulated signal representing the self-transposed signal. But one advantage of the embodiment shown in FIG. 4 is that, since the signal suppressed by device 604 is of constant frequency, this arrangement can be simplified, by means of a trap, i.e. a selective circuit stopping a very narrow frequency band centered on $F_1$ and transmitting the other signal components unattenuated.

The output signal from device 604 is approximately (since the rejector circuit cannot have an infinitely narrow band):

$$A(t)\ B \sin w_1t$$

In the subtractive frequency converter 605 this signal is made to beat with the oscillation $B \sin [w_1t+Z(t)]$ supplied by the first channel and applied at its input 609 to produce signal $A(t)B^2 \sin Z(t)$.

As before, a correct adjustment of the constants or a later adjustment of the level of this signal will provide at the output of the arrangement the desired signal:

$$2A(t) \sin Z(t)$$

It is clear that the choice of the position of frequency $w_1$ with respect to the instantaneous frequency interval of the compound signal, as well as the nature of the frequency changes effected, can be modified in concordant manner to secure the same final result.

The arrangement of FIG. 4 has the further advantage that the operation remains correct in the case of a slow variation of the colour sub-carrier amplitude, so that there is no need to add an improvement of the kind shown in FIG. 3, since device 604 suppresses the component $$A_0B \sin w_1t$$

whatever the value of $A_0$.

Figure 5:
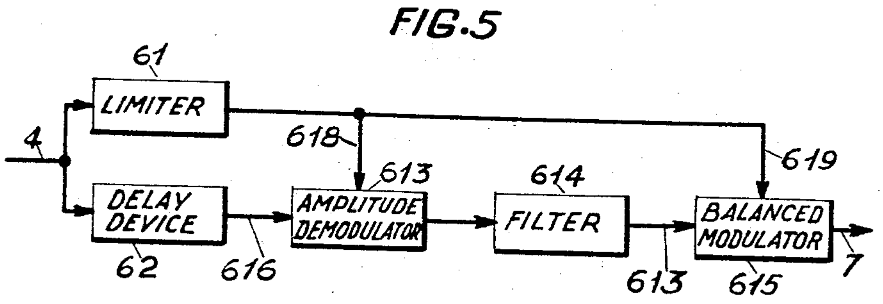

FIG. 5 shows another embodiment of device 6 of FIG. 1, which may be considered as being derived from that of FIG. 4 when the value of frequency $F_1$ is made equal to zero.

Under these conditions the frequency converter 601 of FIG. 4 becomes unnecessary and the output signal from the first channel is, as in FIG. 2, obtained directly at the output of limiter 61.

In this modification the frequency converter 603 of FIG. 4 is replaced by an amplitude demodulator 613 which may be either a conventional amplitude detector using a rectifier, or a synchronous demodulator. In this latter case, which is illustrated by FIG. 5, it receives at its input 618 the output signal from the first channel, which is actually suitable for effecting this demodulation, since it is synchronous with the compound signal to be demodulated.

The signal obtained by this detection or synchronous demodulation is, to within a constant factor (taking into account the limitation level B in the second case), of the form $A_0+A(t)$.

The device 604 of FIG. 4 is replaced by a high-pass filter 614 which stops the DC component $A_0$ in the demodulated signal, so supplying $A(t)$.

Frequency converter 605 is replaced by a balanced modulator 615, the modulating signal being supplied by device 614. The carrier oscillation is the oscillation supplied by the first channel and applied at input 619 of modulator 615. Thus the output signal is, to within a constant factor $$A(t) \sin Z(t)$$

The function of filter 6' of FIG. 1 will now be described.

Experience, supported by theoretical considerations, shows that for each desired component $C_u$ of the approximate partial luminance signal, device 6 produces spurious components, the main one being a component $C_p$ of the same amplitude and with a frequency symmetrical to that of $C_u$ with respect to the instantaneous frequency of the colour carrier. For example, if the component $C_u$ is of the form:

$$C_u=A_u \sin (w_ut+\theta_u)$$

i.e. having an amplitude $A_u$ and an angular frequency $w_u$, the main spurious component will be of the form:

$$C_p=A_p \sin (w_pt+\theta_p)$$

where:

$A_p=A_u$,
$w_p=2w_i-w_u$, and
$w_i$ represents the instantaneous angular frequency of the colour sub-carrier.

As a result, the bandwidth of the difference signal supplied by device 6 of FIG. 1 exceeds that of the compound signal. It is also clear that the components of the difference signal situated outside the bandwith of the compound signal can only be due to spurious components and that their retention is of no value. This explains the usefulness of filter 6' of FIG. 1 whose pass-band is the same as that of the filter, included in the filtering arrangement of FIG. 1, which feeds the output 4 of this separator stage.

It has so far been assumed that in the circuit of FIG. 1 the base signal and the compound signal are complementary, i.e. that their sum would reproduce the complex input signal. But it is possible to exclude from the base signal those components of the luminance signal whose frequencies are higher than the upper limit of the compound signal. According to a further modification, the upper limit of the bandwidth of the compound signal is made less than that of the useful band of the colour channel, the approximate luminance partial signal being always preferably limited to the same bandwidth as the compound signal. This modification can be justified as follows: the importance, from the visual point of view, of the useful components of the approximate luminance partial signal lessens as their frequency increases; similarly, the importance, from the visual point of view, of the spurious components of the approximate luminance partial signal increases as their frequency decreases. By intentionally losing the useful components in the upper part of the colour channel frequency band, spurious components of frequencies situated in the lower part of that band are automatically eliminated.

Taking a simple example, the upper limit of the compound signal may be made equal to the upper limit of the instantaneous frequency interval (frequency excursion) covered by the colour sub-carrier.

The arrangements described are not further altered. In order to understand the operation in this case all that is required is to ignore the additional distortion suffered by the colour sub-carrier on account of the reduced bandwidth of the compound signal as compared to the useful bandwidth of the colour channel.

It has already been mentioned that, ignoring the action of filter 6' of FIG. 1, the approximate luminance partial signal was:

$$La(t)=2A(t)\sin Z(t)$$

that is to say that, designating by $D(t)$ the difference signal $A(t)\sin Z(t)$, the proportionality factor $k$ of $La(t)$ to $D(t)$ was 2.

This is the preferred value as regards the useful components, but the spurious components of the signal $La(t)$ which subsist in the compound signal are multiplied by the same number $k$. As a compromise, factor $k$ may be made less than 2 while preferably remaining greater than 1.

Speaking generally, the various adjustments obtained by varying either the bandwidth of the compound signal, or factor $k$, are part of the invention.

Finally it should be noted that in the case considered hitherto the input signal of device 1 was the normal complex video signal.

Should, for example, this complex video signal have suffered a transformation of the kind mentioned, followed by the addition of a fresh sub-carrier, the preferred value for $k$ would be of the order of 1, as a consequence of the effect of the first operation on the second.

It should be noted that the operation of the device 6, generating the approximate luminance partial signal might be no longer correct on account of too high a level of the luminance components, as this would no longer allow the compound signal to be considered as a carrier oscillation additionally modulated by the luminance components $L(t)$.

This possible condition which, in any case, would arise only sporadically and in a transient manner will not occur if measures of known type are precisely taken at the transmitter end to protect the sub-carrier from high level components of the luminance signal lying in the colour channel.

For example, these luminance signal components are amplitude limited and in this case no difficulty occurs. According to another method, the amplitude of the subcarrier is enhanced when components $L(t)$ are too high. This second method introduces an auxiliary amplitude modulation of the sub-carrier, which may give use to parasitic components at the output of device 6 of FIG. 1.

These components can be suppressed by means of the improvement of FIG. 3 by using an amplitude detection responding not only to the slow amplitude variations of the compound signal, but also to rather more rapid variations due to the above further amplitude modulation. Similarly, with the arrangement of FIG. 4 trap circuit 604 will need to stop a sufficiently wide band with the same object.

Naturally the invention is not restricted to the embodiments described and illustrated.

For example, with an arrangement 6 of the type shown in FIG. 2 or 3, it is possible to omit matrix 65 and to replace adder 9 of FIG. 1 by a matrix with 3 inputs.

With a device 6 of the type of FIGS. 4 and 5, it is also possible to obtain the difference signal at any required level by replacing adder 9 of FIG. 1 by a matrix with 2 inputs.

Another useful decomposition of the complex video signal consists in giving the compound signal a bandwidth which covers the interval of the instantaneous frequencies of the colour sub-carrier, the base signal containing the remainder of the complex video signal.

What is claimed is:

1. A subcarrier suppressing arrangement for a complex video signal including a wide band luminance signal and a subcarrier which is angularly modulated by a colour information, said modulated subcarrier occupying a colour channel lying within the frequency band of the luminance signal, said subcarrier suppressing arrangement comprising: a filtering arrangement for deriving from said video complex signal and delivering, respectively at a first and a second output, a first signal to be designated "base signal" possessing practically only components of the luminance signal, and a second signal to be designated "compound signal" whose frequency bandwidth coincides approximately with the colour channel; amplitude limiting means, having an input coupled to said second output and an output, for delivering an "amplitude limited compound signal"; first means, having a first input coupled to said second output of said filtering arrangement for receiving said compound signal, a second input coupled to said output of said amplitude limiting means for receiving said amplitude limited compound signal and an output, for delivering an approximate partial luminance signal, which is proportional to a "difference signal" equal to the difference between the compound signal and the amplitude limited compound signal multiplied by $A_0/B$, where B is the limitation threshold of the amplitude limiting means and $A_0$ the amplitude of the subcarrier, the approximate partial luminance signal being preferably limited to the frequency bandwidth of the compound signal; and second means, having a first input coupled to said output of said first means and a second input coupled to said first output of said filtering arrangement, for adding the partial luminance signal to the base signal.

2. A subcarrier suppressing arrangement as claimed in claim 1, wherein said base signal and said compound signal are two complementary signals whose sum represents the video complex signal.

3. A subcarrier suppressing arrangement as claimed in claim 1, wherein said base signal does not include the components of the luminance signal whose frequencies are higher than the upper limit of the frequency band of the compound signal.

4. A subcarrier suppressing arrangement as claimed in claim 1, wherein the frequency band of the compound signal coincides with the frequency band of the colour channel.

5. A subcarrier suppressing arrangement as claimed in claim 3, wherein the frequency band of the compound signal is limited towards the upper frequencies by the upper limit of the frequency swing of the subcarrier.

References Cited

UNITED STATES PATENTS

| | | | |
|---|---|---|---|
| 2,895,004 | 7/1959 | Fredendall | 178—5.4 |
| 3,265,810 | 8/1966 | Falk | 178—5.4 |

JOHN W. CALDWELL, *Acting Primary Examiner.*

J. A. O'BRIEN, *Assistant Examiner.*